US012430321B2

(12) United States Patent
Gates et al.

(10) Patent No.: US 12,430,321 B2
(45) Date of Patent: Sep. 30, 2025

(54) COMMUNICATION TRANSMISSION USING A COMMUNICATION ALLOCATION BASED ON ITERATIVE PROCESSING

(71) Applicant: Capital One Services, LLC, McLean, VA (US)

(72) Inventors: Derek Gates, Prosper, TX (US); Zachary Alexander Cericola, Dallas, TX (US); Harish Govindarajulu, McKinney, TX (US); Shyam Kumar, Irving, TX (US); Valerie Colon, Little Elm, TX (US); Alyssa Lauren Fincher Noyola, Rowlett, TX (US); Katherine Marie Voss-Robinson, Frisco, TX (US); Zawahir Faheem, Richmond, TX (US); Shiqi Li, Bellevue, WA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 18/465,041

(22) Filed: Sep. 11, 2023

(65) Prior Publication Data
US 2025/0086165 A1   Mar. 13, 2025

(51) Int. Cl.
*G06F 16/23* (2019.01)
*G06F 16/22* (2019.01)

(52) U.S. Cl.
CPC .......... *G06F 16/2379* (2019.01); *G06F 16/22* (2019.01)

(58) Field of Classification Search
CPC ........ G06Q 40/02; G06Q 40/04; G06Q 40/06; G06Q 30/02; G06Q 30/0201; G06Q 30/0202; G06Q 30/0203; G06Q 30/0204; G06Q 30/0205; G06Q 30/0206; G06Q 30/0211; G06Q 30/0241; G06Q 30/0251; G06Q 10/04; G06Q 10/06; G06Q 10/0631; G06Q 10/06315; G06Q 10/0637; G06Q 10/06375; G06Q 50/01; G06N 20/00;

(Continued)

(56) References Cited

U.S. PATENT DOCUMENTS 10,178,111 B1 * 1/2019 Wilson ............... G06Q 20/4016
2004/0267611 A1 * 12/2004 Hoerenz ............ G06Q 30/0241
705/14.13

(Continued)

*Primary Examiner* — Robert W Beausoliel, Jr.
*Assistant Examiner* — Cheryl M Shechtman
(74) *Attorney, Agent, or Firm* — Harrity & Harrity, LLP

(57) ABSTRACT

In some implementations, a device may identify a plurality of individuals that form a target pool for transacting with a plurality of entities. The device may determine responsiveness associations between the plurality of individuals and the plurality of entities. The device may perform, based on the responsiveness associations and a composition of the target pool, multiple iterations of computations of respective quantities of individuals predicted to transact with one or more of the plurality of entities and respective communication allocations predicted to realize transactions for the respective quantities of individuals. Each iteration, of the multiple iterations of computations, may be initiated by an update to the composition of the target pool in response to an entity accepting a communication allocation. The device may cause, based on the entity accepting the communication allocation, transmission of a plurality of communications in accordance with the communication allocation.

20 Claims, 9 Drawing Sheets

(58) Field of Classification Search
CPC .. G06N 5/04; G06N 7/01; G06F 16/22; G06F 16/2379; G06F 16/285; G06F 16/903; G06F 16/9035; G06F 16/9535; G06F 16/9536
See application file for complete search history.

(56) References Cited

U.S. PATENT DOCUMENTS

| | | | |
|---|---|---|---|
| 2006/0265259 A1* | 11/2006 | Diana | G06Q 30/0201 705/35 |
| 2015/0348072 A1* | 12/2015 | Goodyear | G06Q 20/1085 705/7.33 |
| 2018/0018709 A1* | 1/2018 | Sela | H04M 3/2263 |
| 2022/0101383 A1* | 3/2022 | Bloom | G06Q 50/01 |
| 2024/0265366 A1* | 8/2024 | Songa | G06Q 20/202 |

* cited by examiner

COMMUNICATION TRANSMISSION USING A COMMUNICATION ALLOCATION BASED ON ITERATIVE PROCESSING

BACKGROUND

A communication device may transmit communications by email, text message, automated phone calls, or the like. In some examples, the communication device may transmit hundreds, thousands, or even millions of communications over a relatively short period of time. Sometimes, a recipient of a communication may not open, read, answer, or respond to the communication.

SUMMARY

Some implementations described herein relate to a system for communication transmission using a communication allocation based on iterative processing. The system may include one or more memories and one or more processors communicatively coupled to the one or more memories. The one or more processors may be configured to cause population of a first database with a first plurality of records relating to a plurality of individuals that form a target pool for transacting with a plurality of entities, where each record, of the first plurality of records, is unique to a respective individual of the plurality of individuals. The one or more processors may be configured to cause population of a second database with a second plurality of records indicating responsiveness associations between the plurality of individuals and the plurality of entities. The one or more processors may be configured to perform one or more iterations of populations of a third database, where each iteration, of the one or more iterations of populations, causes the third database to be populated with records that indicate, based on a composition of the target pool and the responsiveness associations indicated by the second plurality of records, respective quantities of individuals predicted to transact with one or more of the plurality of entities and respective communication allocations predicted to realize transactions for the respective quantities of individuals, and where each iteration, of the one or more iterations of populations, is initiated by an update to the first database indicating an update to the composition of the target pool in response to an entity, of the plurality of entities, accepting a communication allocation, of the respective communication allocations, for a quantity of individuals, of the respective quantities of individuals, associated with the entity. The one or more processors may be configured to cause, based on the entity accepting the communication allocation, transmission of a plurality of communications in accordance with the communication allocation.

Some implementations described herein relate to a method of communication transmission using a communication allocation based on iterative processing. The method may include identifying, by a device, a plurality of individuals that form a target pool for transacting with a plurality of entities. The method may include determining, by the device, responsiveness associations between the plurality of individuals and the plurality of entities. The method may include performing, by the device and based on the responsiveness associations and a composition of the target pool, multiple iterations of computations of respective quantities of individuals predicted to transact with one or more of the plurality of entities and respective communication allocations predicted to realize transactions for the respective quantities of individuals, where each iteration, of the multiple iterations of computations, is initiated by an update to the composition of the target pool in response to an entity, of the plurality of entities, accepting a communication allocation, of the respective communication allocations, for a quantity of individuals, of the respective quantities of individuals, associated with the entity. The method may include causing, by the device and based on the entity accepting the communication allocation, transmission of a plurality of communications in accordance with the communication allocation.

Some implementations described herein relate to a non-transitory computer-readable medium that stores a set of instructions for iterative processing. The set of instructions, when executed by one or more processors of a device, may cause the device to identify a plurality of individuals that form a target pool for transacting with a plurality of entities. The set of instructions, when executed by one or more processors of the device, may cause the device to determine responsiveness associations between the plurality of individuals and the plurality of entities. The set of instructions, when executed by one or more processors of the device, may cause the device to perform, based on a composition of the target pool and the responsiveness associations, multiple iterations of computations of respective quantities of individuals predicted to transact with one or more of the plurality of entities and respective communication allocations predicted to realize transactions for the respective quantities of individuals, where each iteration, of the multiple iterations of computations, is initiated by an update to the composition of the target pool in response to an entity, of the plurality of entities, accepting a communication allocation, of the respective communication allocations, for a quantity of individuals, of the respective quantities of individuals, associated with the entity.

DETAILED DESCRIPTION

Figure 1A:
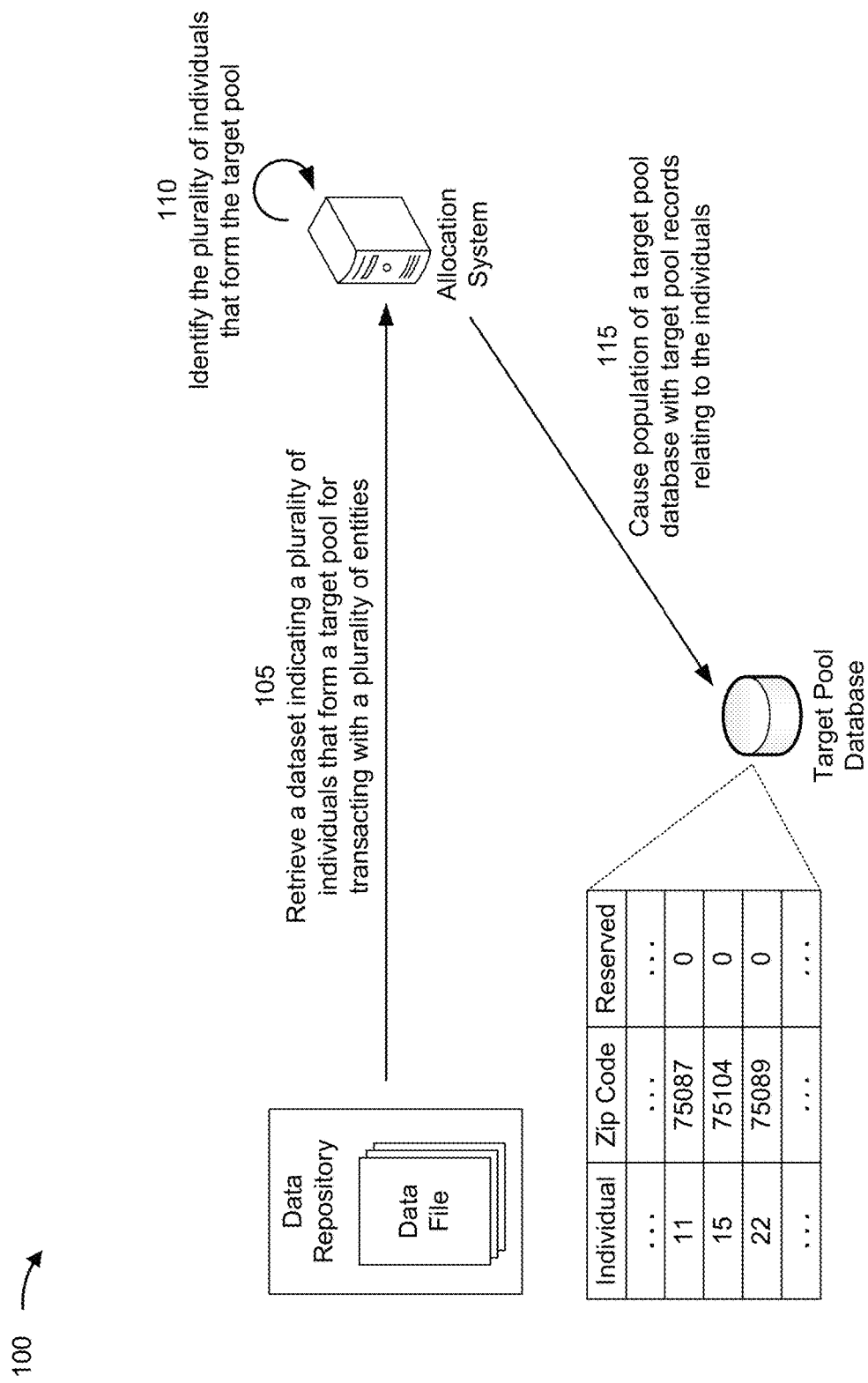
FIGS. 1A-1F are diagrams of an example associated with communication transmission using a communication allocation based on iterative processing, in accordance with some embodiments of the present disclosure.

The following detailed description of example implementations refers to the accompanying drawings. The same reference numbers in different drawings may identify the same or similar elements.

Communications may be transmitted by email, text message, automated phone calls, or the like. In general, the transmission of a single communication may use minimal computing resources (e.g., memory resources, processor resources, or the like) of the transmitter and minimal resources of a communications network on which the communication is transmitted. However, commonly, an entity may be engaged in operations that call for the transmission of hundreds, thousands, or even millions of communications, which in the aggregate place a significant burden on computing resources and network resources. In some examples, a batch of communications may be transmitted to achieve a particular objective (e.g., convert a particular amount of sales, drive a particular amount of traffic to a website, or the like). Thus, by transmitting communications in a quantity that is more than needed to achieve an objective, significant computing resources and network resources may be expended in an inefficient manner.

Some implementations described herein enable the transmission of communications in accordance with a communication allocation. The communications may be transmitted to user devices of numerous individuals in a target pool, which represents a total pool of individuals to which communications may be transmitted. The communication allocation may indicate a quantity of communications that should be transmitted to realize a particular objective (e.g., a communication allocation of 10,000 communications to the target pool may be needed to convert 10 sales for an entity).

In some implementations, an allocation system may determine the communication allocation using iterative processing. For example, the allocation system may perform multiple iterations of computations that dynamically adjust the communication allocation, for a particular objective (e.g., converting 10 sales for an entity), each time the composition of the target pool is updated (e.g., due to individuals being removed from the target pool when those individuals have been reserved in connection with another communication allocation). During the iterations of computations, the allocation system may populate a plurality of databases with data indicating a state of the iterations of the computations. The databases enable the state of the iterations to be preserved (e.g., during delays between successive iterations) in an efficient manner that conserves memory resources.

Iteratively and dynamically adjusting the communication allocation as the target pool changes facilitates prediction of the communication allocation with a high degree of accuracy. Thus, the accuracy of the communication allocation provides for the transmission of a quantity of communications that will correspond closely with the particular objective that is intended, so that excessive communications are not transmitted. In this way, the transmission of the communications, in accordance with the communication allocation, more efficiently utilizes computing resources and network resources.

FIGS. 1A-1F are diagrams of an example 100 associated with communication transmission using a communication allocation based on iterative processing. As shown in FIGS. 1A-1F, example 100 includes an allocation system, a data repository, a data system (e.g., including one or more databases), an entity device, and one or more user devices. These devices are described in more detail in connection with FIGS. 2 and 3. The allocation system may be associated with an entity, such as a financial institution.

As shown in FIG. 1A, and by reference number 105, the allocation system may retrieve a dataset indicating a plurality of individuals that form a target pool for transacting with a plurality of entities. The allocation system may retrieve the dataset from a data repository, such as a data lake. The dataset may indicate, for an individual of the target pool, an identifier for the individual (e.g., for anonymous identification of the individual), a residence city of the individual, a residence state of the individual, a zip code of the individual, and/or a credit score for the individual, among other examples.

The plurality of entities may perform transactions with individuals in connection with goods and/or services (e.g., each of the plurality of entities may perform transactions in connection with the same type of goods and/or services). For example, the plurality of entities may be merchants (e.g., each belonging to the same merchant category), such as vehicle dealerships. The information relating to the plurality of individuals may have been contributed to the dataset by one or more of the plurality of entities, by the entity associated with the allocation system, and/or by other sources (e.g., credit bureaus). For example, the plurality of individuals may have previously expressed interest (e.g., by registering to receive informational materials, registering for a service, or the like) in conducting a transaction (e.g., purchasing a vehicle). As another example, the plurality of individuals may have credit scores that satisfy a threshold. Thus, the target pool may represent a total set of individuals (e.g., of known individuals) that could potentially have interest in conducting transactions (e.g., purchasing vehicles) with one or more of the entities and/or that have sufficient financial qualifications to conduct transactions with one or more of the entities.

In some implementations, the dataset may be distributed across multiple sources (e.g., across multiple data repositories and/or across multiple files of a single data repository). In some implementations, the allocation system may use a data loader function to retrieve the dataset (e.g., retrieve data from the multiple sources and aggregate the data into the dataset). For example, the data loader function may be a serverless function. In some implementations, the allocation system may retrieve the dataset responsive to an event (e.g., an administrator input indicating that the dataset is to be retrieved and/or indicating the start of a promotional event). As an example, the data loader function may be initiated responsive to the event, and the data loader function may connect to a service (e.g., a microservice) via an endpoint (e.g., an application programming interface (API) endpoint). The service may retrieve the dataset from the data repository, and return the dataset to the data loader function.

As shown by reference number 110, the allocation system may identify the plurality of individuals that form the target pool. For example, the allocation system may identify the plurality of individuals from the dataset retrieved from the data repository. In addition to, or without, use of the dataset, the allocation system may identify the plurality of individuals that form the target pool with reference to other data. For example, the allocation system may identify individuals that the allocation system predicts to have interest in conducting a transaction. As an example, the allocation system may obtain vehicle data (e.g., vehicle registration data, traffic citation data, vehicle maintenance records, vehicle transaction data, or the like), and the allocation system may predict (e.g., using a machine learning model) whether individuals have interest in purchasing a vehicle based on the vehicle data (e.g., based on an age of an individual's current vehicle, a time duration that an individual has owned a current vehicle, whether an individual's current vehicle has been involved in an accident, a type of repair performed for an individual's vehicle, or the like).

As shown by reference number 115, the allocation system may cause population of a first database with a first plurality of records relating to the plurality of individuals of the target pool. The first database may be referred to herein as the "target pool database" and the first plurality of records may be referred to herein as the "target pool records." Each target pool record may be unique to a respective individual of the plurality of individuals. In other words, the target pool records may include exactly one record for each individual of the plurality of individuals. The allocation system may cause population of the target pool database responsive to retrieving the dataset from the data repository. For example, the data loader function, responsive to receiving the dataset via the service endpoint, may cause population of the target pool database with the target pool records.

Figure 1B:
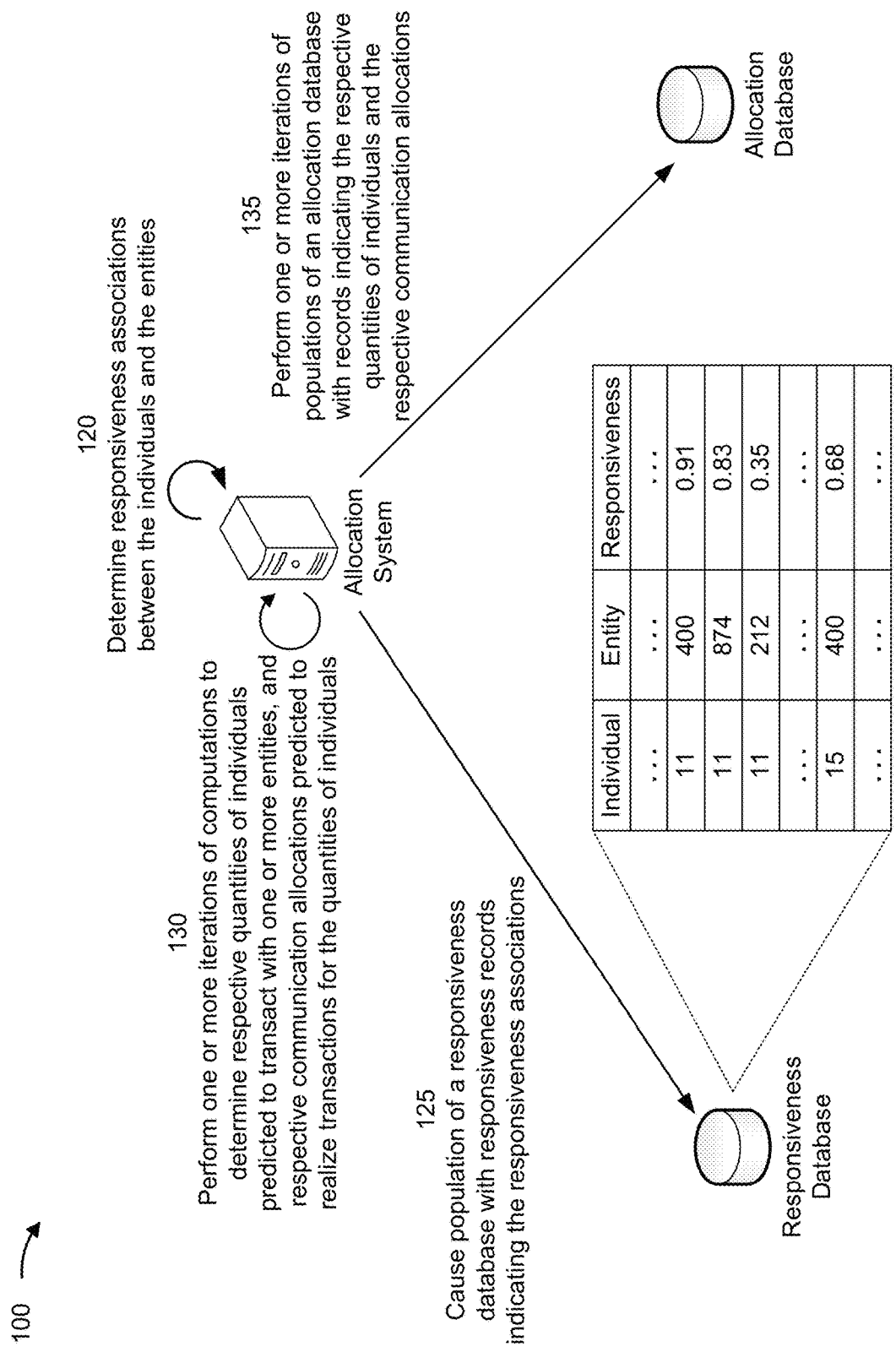

As shown in FIG. 1B, and by reference number 120, the allocation system may determine responsiveness associations between the plurality of individuals and the plurality of entities. For example, the allocation system may determine respective responsiveness associations between an individual and one or more of the plurality of entities (e.g., each of the plurality of entities). A responsiveness association between a particular individual and a particular entity may indicate a measure of responsiveness of the individual toward the entity. The measure of responsiveness may indicate how good of a match the individual and the entity are in connection with conducting a transaction (e.g., purchasing a vehicle), but may be unrelated to a probability of the individual conducting a transaction with the entity (which is described below). For example, the responsiveness association may indicate a probability that the individual is to apply for financing for a transaction (e.g., to purchase a vehicle) through the entity.

The responsiveness associations may be based on distances between first residence locations of the plurality of individuals and locations of the plurality of entities (e.g., dealership locations), may be based on historical distances between second residence locations of transacting individuals, that have historically transacted with the plurality of entities, and the locations of the plurality of entities, may be based on characteristics of goods and/or services offered by the plurality of entities (e.g., individuals may be more receptive to particular brands), may be based on how recently the plurality of individuals last performed transactions relating to the same goods and/or services offered by the plurality of entities (e.g., last purchased a vehicle), and/or how recently the plurality of individuals applied for financing to conduct transactions, among other examples. As an example, an individual that lives 5 miles from an entity, that has historically conducted transactions with individuals living an average of 20 miles away, may have a high responsiveness association with the entity. However, an individual that lives 50 miles from the entity may have a low responsiveness association with the entity. To determine the responsiveness associations, the allocation system may use a machine learning model trained to determine responsiveness associations based on an input relating to at least the distances and/or the historical distances, described above, among other examples.

As shown by reference number 125, the allocation system may cause population of a second database with a second plurality of records indicating the responsiveness associations between the plurality of individuals and the plurality of entities. The second database may be referred to herein as the "responsiveness database" and the second plurality of records may be referred to herein as the "responsiveness records." Each individual of the plurality of individuals may be associated with multiple responsiveness records. For example, the responsiveness database may include a first responsiveness record indicating a responsiveness association between an individual and a first entity, a second responsiveness record indicating a responsiveness association between the individual and a second entity, and so forth. The allocation system may cause population of the responsiveness database responsive to retrieving the dataset from the data repository. For example, the data loader function, responsive to receiving the dataset via the service endpoint, may cause population of the responsiveness database with the responsiveness records.

As shown by reference number 130, the allocation system may perform one or more iterations of computations (e.g., multiple iterations of computations). The allocation system may perform the iterations of computations to determine respective quantities of individuals predicted to transact with one or more of the plurality of entities (e.g., predicted to transact with the entities in connection with vehicles, such as purchasing the vehicles), and to determine respective communication allocations predicted to realize transactions for the respective quantities of individuals. For example, in an iteration, the allocation system may compute (e.g., determine), for every remaining entity that has not accepted a communication allocation (as described below), a quantity of individuals predicted to transact with the entity and a communication allocation predicted to realize transactions for the quantity of individuals. In some implementations, the allocation system may compute, for a single entity, multiple quantities of individuals and corresponding communication allocations, representing multiple option tiers for the entity.

A quantity of individuals predicted to transact with an entity may indicate an estimate of the number of individuals that have a probability (e.g., above a threshold) of conducting a transaction (e.g., purchasing a vehicle) with the entity (e.g., the amount of individuals that applied for financing that will end up actually conducting a transaction). A communication allocation predicted to realize transactions for the quantity of individuals may indicate a quantity of communications to be transmitted (e.g., indicate an amount of individuals that should receive a communication) in order to achieve the quantity of individuals actually conducting transactions with the entity. Thus, the quantity of communications may be greater than the quantity of individuals. For example, 10,000 communications (e.g., relating to marketing for a transaction, an offer for a transaction, or the like) may be transmitted to individuals to achieve 10 of those individuals actually conducting transactions with the entity. In some implementations, a communication allocation may be expressed as a dollar amount, indicating a cost to transmit the quantity of communications.

A quantity of individuals predicted to transact with an entity and/or the communication allocation to realize those transactions may be computed based on a composition of the target pool, the responsiveness associations, and/or probability data characterizing a probability that an individual will transact with an entity (e.g., in general, rather than with respect to a particular individual or entity). The probability data may be stored in a fourth database, and may be static or infrequently updated. The first database, the second database, the third database, and the fourth database may each include one or more database tables that are included in a single database system or distributed across multiple database systems.

For each of the individuals remaining in the target pool, the allocation system may compute a probability that the particular individual will transact with an entity based on the responsiveness association between the individual and the entity as well as the probability data. Based on probabilities computed for all of the individuals remaining in the target pool (or all of the individuals that have responsiveness associations with the entity), the allocation system may determine the quantity of individuals predicted to transact with the entity as including those individuals associated with a probability that satisfies a threshold (e.g., 51%, 75%, 90%, or the like) and/or those individuals whose probability for the entity is their highest probability. Moreover, the allocation system may determine the corresponding communication allocation based on the probabilities associated with individuals predicted to transact with the entity. For example, lower probabilities may indicate a greater communication allocation, whereas higher probabilities may indicate a lesser communication allocation.

Each iteration of the computations may be initiated by an update (e.g., a change) to the composition of the target pool (e.g., an update can include the original initialization of the target pool described above). For example, each iteration may be initiated by an update to the target pool database indicating an update to the composition of the target pool. As described below, an update to the composition of the target pool may be in response to an entity accepting a communication allocation, for a quantity of individuals, that is indicated for the entity by a computation. For example, the update to the composition of the target pool may remove, from the target pool, the individuals that were included in the quantity of individuals indicated for the entity. As an example, removing an individual from the target pool may include updating a target pool record, associated with the individual, in the target pool database to indicate that the individual is removed from the target pool.

As shown by reference number 135, the allocation system may perform one or more iterations of populations (e.g., multiple iterations of populations) of a third database with records indicating respective quantities of individuals predicted to transact with one or more of the plurality of entities and respective communication allocations predicted to realize transactions for the respective quantities of individuals. The third database may be referred to herein as the "allocation database" and the records may be referred to herein as the "allocation records." The iterations of populations of the allocation database may coincide with the iterations of computations described in connection with reference number 130. For example, each iteration of the populations may cause the allocation database to be populated with allocation records based on a respective iteration of the computations. As an example, each iteration of the populations may cause the allocation database to be populated with allocation records indicating respective quantities of individuals and respective communication allocations that were determined in a preceding iteration of computations.

Figure 1C:
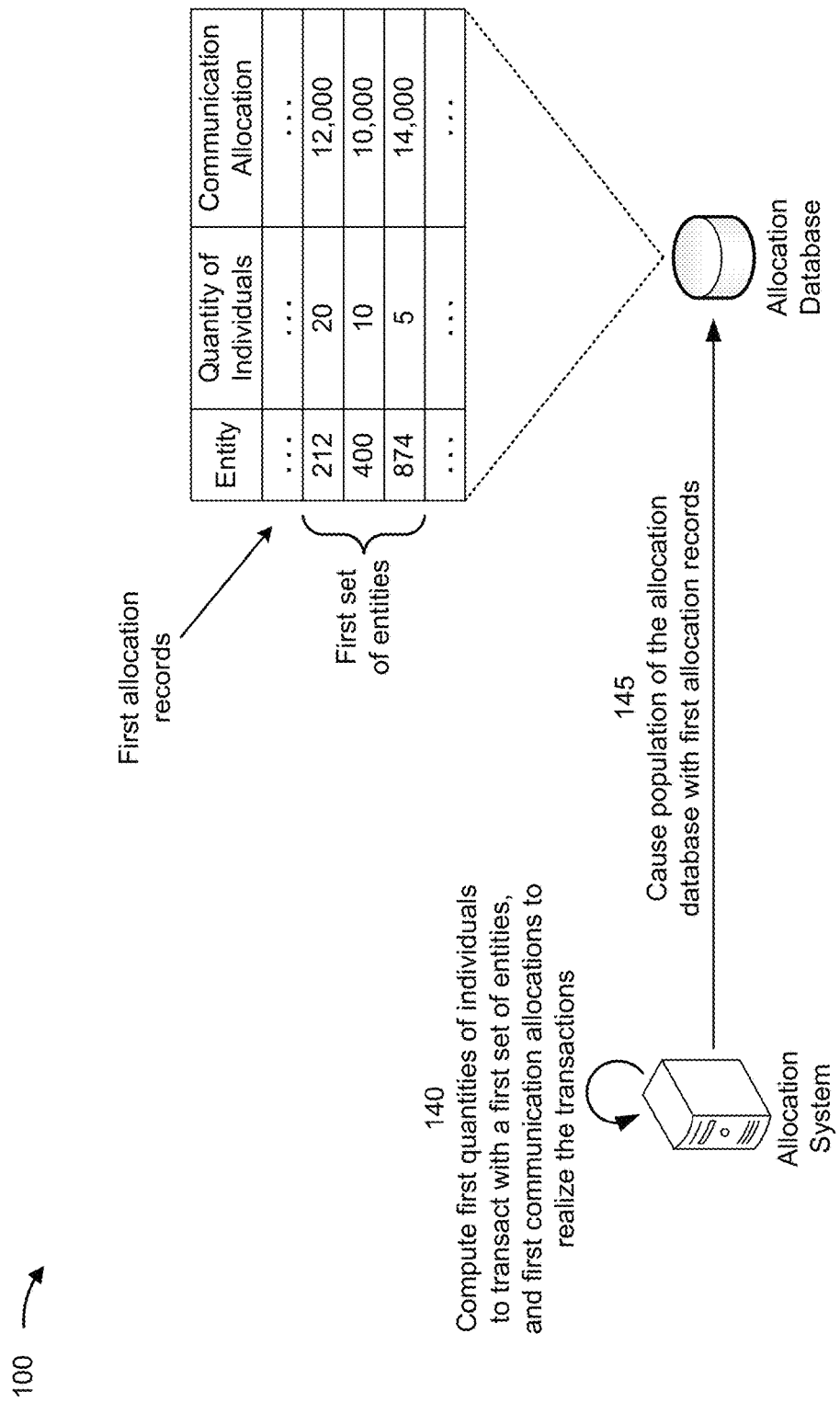
Figure 1D:
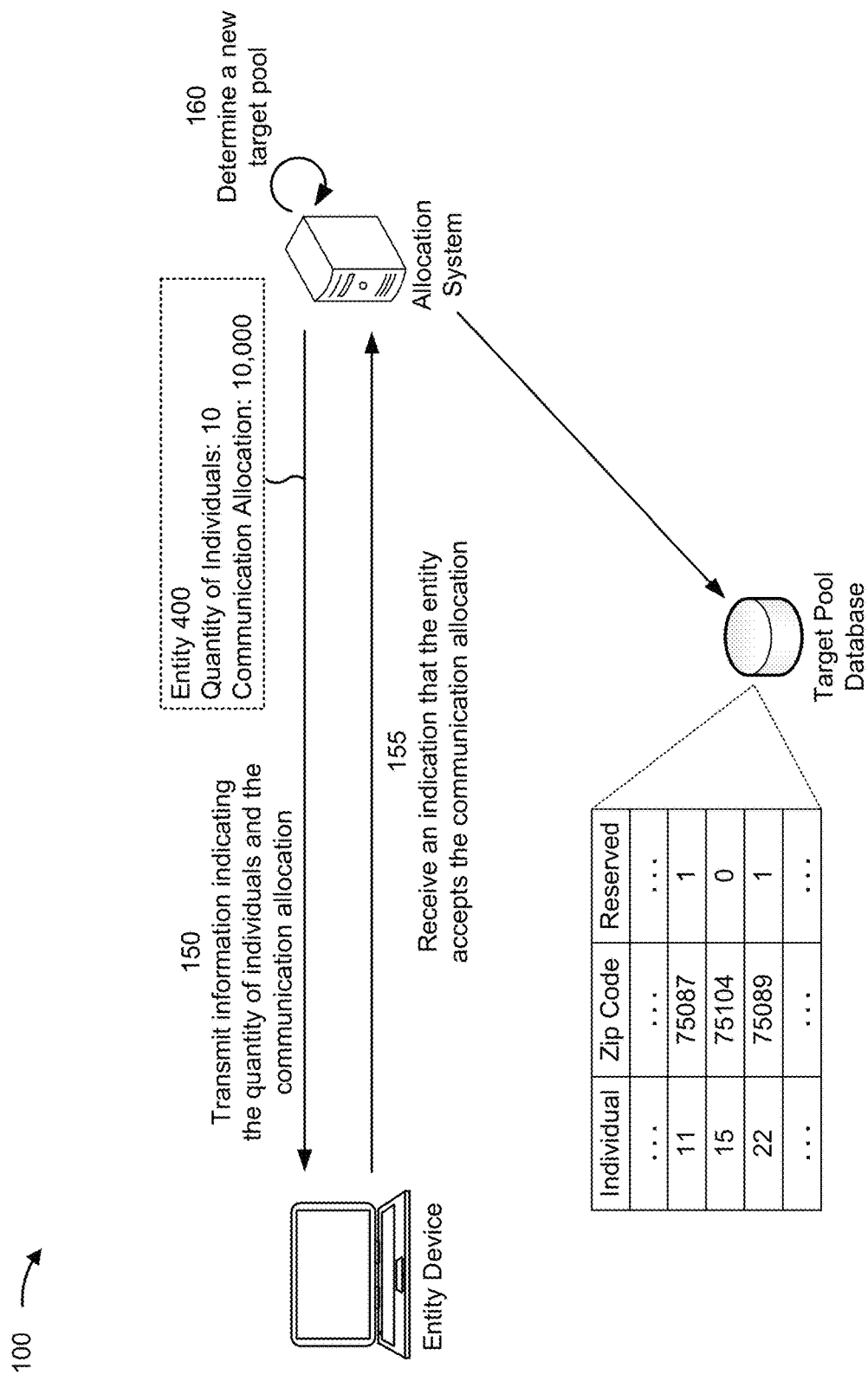
Figure 1E:
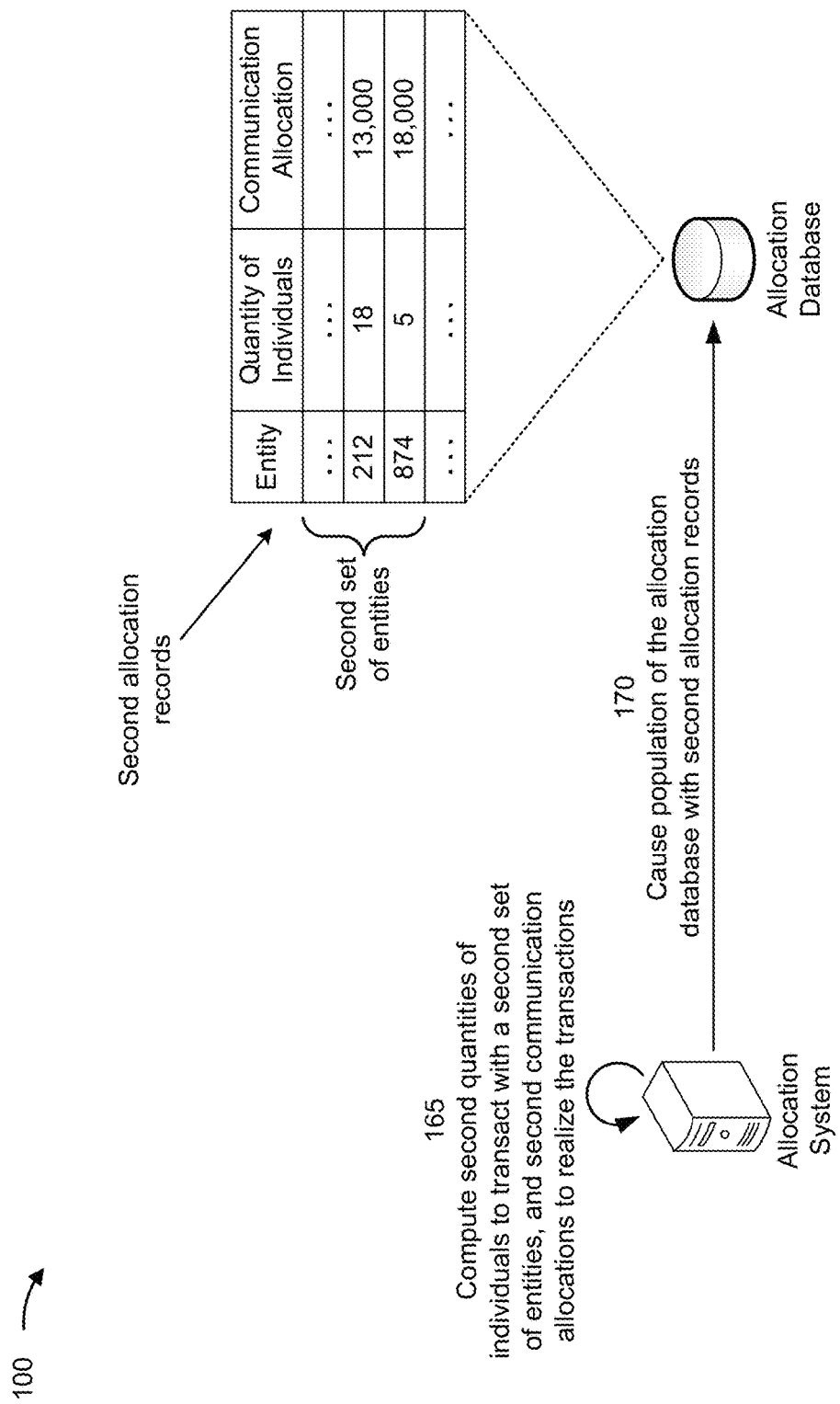

FIGS. 1C-1E show an example of the iterations of computations and the iterations of populations described herein. As shown in FIG. 1C, and by reference number 140, in a first iteration of the computations, the allocation system may compute first respective quantities of individuals predicted to transact with a first set of the entities and first respective communication allocations predicted to realize transactions for the first respective quantities of individuals. The computations of the first respective quantities of individuals and the first respective communication allocations may be based on a first composition of the target pool, the responsiveness associations (e.g., relating to individuals of the first composition of the target pool), and/or the probability data. Moreover, the first set of entities may include remaining entities (as described below) at a time of the first iteration. As shown by reference number 145, in a first iteration of the populations, the allocation system may cause population of the allocation database with first allocation records indicating the first respective quantities of individuals and the first respective communication allocations.

As shown in FIG. 1D, and by reference number 150, for a particular entity (e.g., of the first set of entities), the allocation system may transmit (e.g., to the entity device associated with the entity) information indicating the quantity of individuals and the communication allocation associated with the entity (e.g., as indicated for the entity in the first allocation records). For example, transmitting the information may cause the information to be presented in a user interface displayed on the entity device. The user interface may include input elements for accepting or rejecting the communication allocation. In some implementations, the information may indicate multiple option tiers for the quantity of individuals and the corresponding communication allocations, as described above.

As shown by reference number 155, the allocation system may receive (e.g., from the entity device), an indication that the entity accepts the communication allocation (or rejects the communication allocation). Acceptance of the communication allocation indicates that the entity wishes to proceed with communication transmissions in accordance with the communication allocation. In some implementations, the entity may receive the information indicating the quantity of individuals and the communication allocation from personnel of the entity associated with the allocation system (e.g., via an email, a telephone call, or the like), and the entity may likewise communicate acceptance of the communication allocation to the personnel. Once the entity has accepted the communication allocation, the entity may be removed from the set of entities for which quantities of individuals and communication allocations are computed.

As shown by reference number 160, based on the entity accepting the communication allocation, the allocation system may determine a new target pool that removes one or more individuals, included in the quantity of individuals, from the target pool. For example, the allocation system may cause, based on the entity accepting the communication allocation, updating of one or more target pool records to indicate removal of the quantity of individuals from the target pool. In effect, updating the target pool to remove particular individuals reserves those individuals for the entity (e.g., even if those individuals do not ultimately conduct a transaction with the entity). In some implementations, the allocation system may update the target pool (e.g., update the target pool database) using a service (e.g., a microservice) via an endpoint (e.g., an API endpoint). In some implementations, the allocation system may reverse an update of the target pool (e.g., re-add removed individuals back to the target pool) responsive to the entity canceling the previous acceptance of the communication allocation. For example, the allocation system may reverse the update by using a service (e.g., a microservice) via an endpoint (e.g., an API endpoint). As described herein, updating the target pool may trigger additional iterations of the computations and the populations.

As shown in FIG. 1E, and by reference number 165, in a second iteration of the computations, the allocation system may compute second respective quantities of individuals predicted to transact with a second set of the entities and second respective communication allocations predicted to realize transactions for the second respective quantities of individuals. The computations of the second respective quantities of individuals and the second respective communication allocations may be based on a second composition of the target pool (e.g., the new target pool), the responsiveness associations (e.g., relating to individuals of the second composition of the target pool), and/or the probability data. The first composition of the target pool is likely to include individuals more likely to conduct a transaction than individuals in the second composition of the target pool (e.g., because individuals with higher probabilities of conducting a transaction will be reserved first). Thus, relative to the first respective quantities of individuals and the first respective communication allocations, the second respective quantities of individuals may be lower and/or the second respective communication allocations may be higher. Moreover, the second set of entities may include remaining entities at a time of the second iteration. For example, the first set of entities may include at least one entity (e.g., the entity that accepted the communication allocation) that is not included in the second set of entities. In other words, the second composition of the target pool may differ from the first composition of the target pool, and the second set of entities may differ from the first set of entities, based on the entity accepting the communication allocation.

As shown by reference number 170, in a second iteration of the populations, the allocation system may cause population (e.g., repopulation) of the allocation database with second allocation records indicating the second respective quantities of individuals and the second respective communication allocations. Iterations of the computations and the populations may continue, in a similar manner as described above, until all individuals have been removed from the target pool or all viable individuals (e.g., individuals having at least a threshold probability of conducting a transaction) have been removed from the target pool.

Figure 1F:
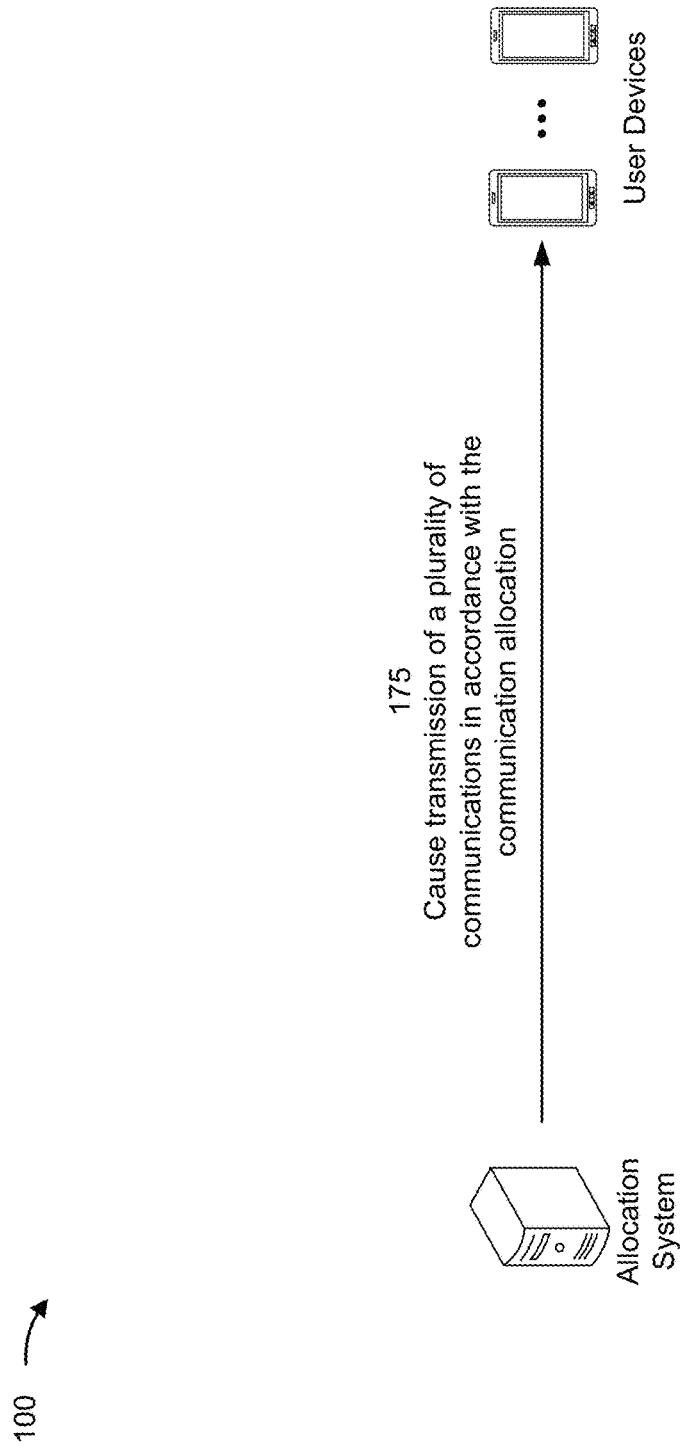

As shown in FIG. 1F, and by reference number 175, based on an entity accepting a communication allocation, the allocation system may cause transmission of a plurality of communications in accordance with the communication allocation (e.g., which indicates the quantity of communications that are to be transmitted). The communications may indicate marketing for a transaction (e.g., in connection with purchase of a vehicle), an offer for a transaction, an offer for financing in connection with a transaction, or the like, in connection with the entity. The communications may include email messages, text messages, automated telephone calls, and/or messages in a user interface (e.g., a web page, a mobile application user interface, or an extended reality user interface), among other examples. In some implementations, the allocation system may generate the communications (e.g., using templates, using a generative language model, or the like) and/or may transmit the communications. In some implementations, the allocation system may cause another device (e.g., by providing a request indicating the quantity of communications and/or a list of individuals that are to receive the communications) to generate the communications and/or to transmit the communications.

Each communication may be intended for a respective individual from the full target pool. One or more of the communications may be for the individuals from the target pool reserved for the entity (however, the reservation of the individuals for the entity facilitates the iterations of computations described above, and does not necessarily indicate that those individuals will receive communications in connection with the entity). The allocation system may cause transmission of the communications to respective user devices of the individuals (e.g., as emails or text messages). In some implementations, the allocation system may cause transmission of the communications via a telephone system in connection with automated calls placed to the individuals. In some implementations, the allocation system may cause transmission of the communications to a printer, or a similar output device, to cause printing of hard copies of the communications for mailing to the individuals.

In some implementations, for a communication to an individual, the allocation system may generate driving directions from the individual to the entity, and/or generate a link that is configured to launch a user interface, on a device of the individual, indicating driving directions from the individual to the entity, and the communication may indicate the driving directions and/or the link. Additionally, or alternatively, for a communication to an individual, the allocation system may generate a link that is configured to initiate a communication session (e.g., a video conference, a voice call, a chat session, or the like) between the individual and the entity, and the communication may indicate the link.

In this way, the communication allocation provides for the transmission of a quantity of communications that will correspond closely with the particular objective that is intended (e.g., converting transactions between the quantity of individuals and the entity), so that excessive communications are not transmitted. In this way, the transmission of the communications, in accordance with the communication allocation, more efficiently utilizes computing resources and network resources.

As indicated above, FIGS. 1A-1F are provided as an example. Other examples may differ from what is described with regard to FIGS. 1A-1F.

Figure 2:
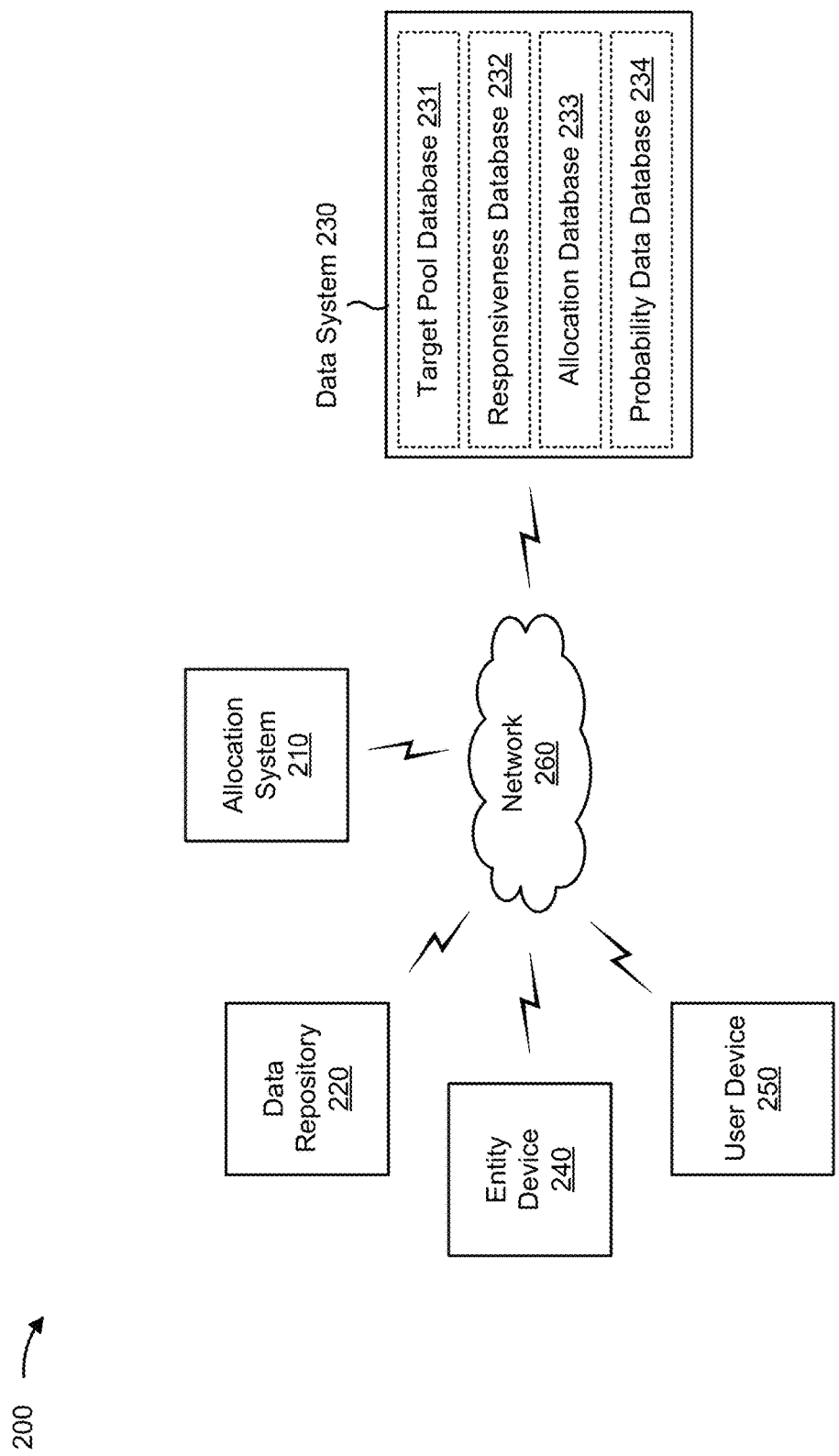
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an allocation system 210, a data repository 220, a data system 230 (e.g., including a target pool database 231, a responsiveness database 232, an allocation database 233, and/or a probability data database 234), an entity device 240, a user device 250, and a network 260. Devices of environment 200 may interconnect via wired connections, wireless connections, or a combination of wired and wireless connections.

The allocation system 210 may include one or more devices capable of receiving, generating, storing, processing, providing, and/or routing information associated with computation of a communication allocation based on iterative processing, as described elsewhere herein. The allocation system 210 may include a communication device and/or a computing device. For example, the allocation system 210 may include a server, such as an application server, a client server, a web server, a database server, a host server, a proxy server, a virtual server (e.g., executing on computing hardware), or a server in a cloud computing system. In some implementations, the allocation system 210 may include computing hardware used in a cloud computing environment.

The data repository 220 may include one or more devices capable of receiving, generating, storing, processing, providing, and/or routing information associated with a target pool of individuals, as described elsewhere herein. The data repository 220 may include a communication device and/or a computing device. For example, the data repository 220 may include a server, such as an application server, a client server, a web server, a database server, a host server, a proxy server, a virtual server (e.g., executing on computing hardware), or a server in a cloud computing system. In some implementations, the data repository 220 may include computing hardware used in a cloud computing environment.

The data system 230 may include one or more devices capable of receiving, generating, storing, processing, and/or providing information associated with computation of a communication allocation based on iterative processing, as described elsewhere herein. The data system 230 may include a communication device and/or a computing device. For example, the data system 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data system 230 may include the target pool database 231, the responsiveness database 232, the allocation database 233, and/or the probability data database 234. For example, these databases may store records that preserve a state of iterations of the iterative processing, as described elsewhere herein.

The entity device 240 may include one or more devices capable of receiving, generating, storing, processing, and/or providing information associated with accepting or rejecting a communication allocation, as described elsewhere herein. The entity device 240 may include a communication device and/or a computing device. For example, the entity device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The user device 250 may include one or more devices capable of receiving, storing, and/or processing a communication transmitted in accordance with a communication allocation, as described elsewhere herein. The user device 250 may include a communication device and/or a computing device. For example, the user device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
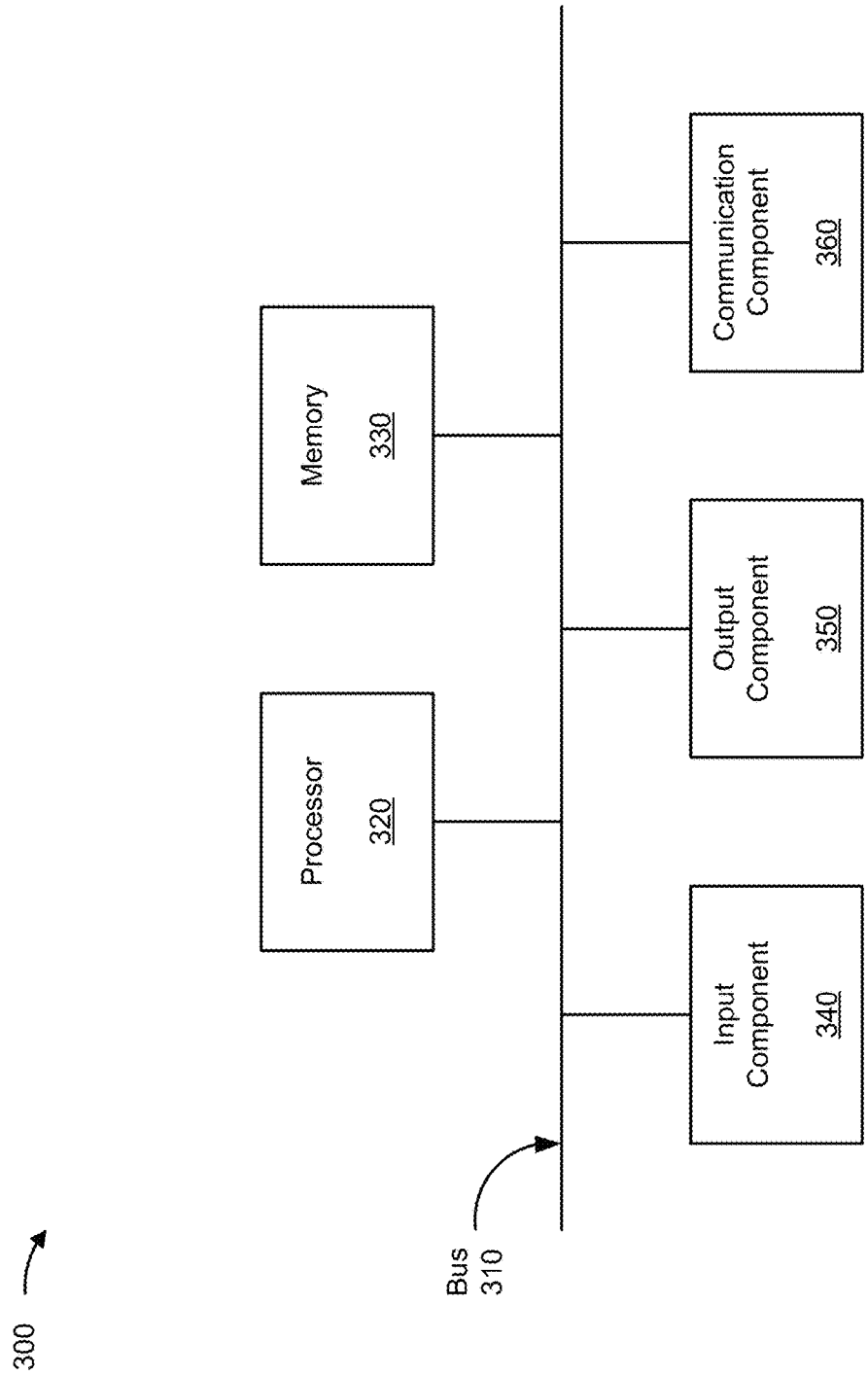
FIG. 3 is a diagram of example components of a device associated with communication transmission using a communication allocation based on iterative processing, in accordance with some embodiments of the present disclosure.

FIG. 3 is a diagram of example components of a device 300 associated with communication transmission using a communication allocation based on iterative processing. The device 300 may correspond to allocation system 210, data repository 220, data system 230, entity device 240, and/or user device 250. In some implementations, allocation system 210, data repository 220, data system 230, entity device 240, and/or user device 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
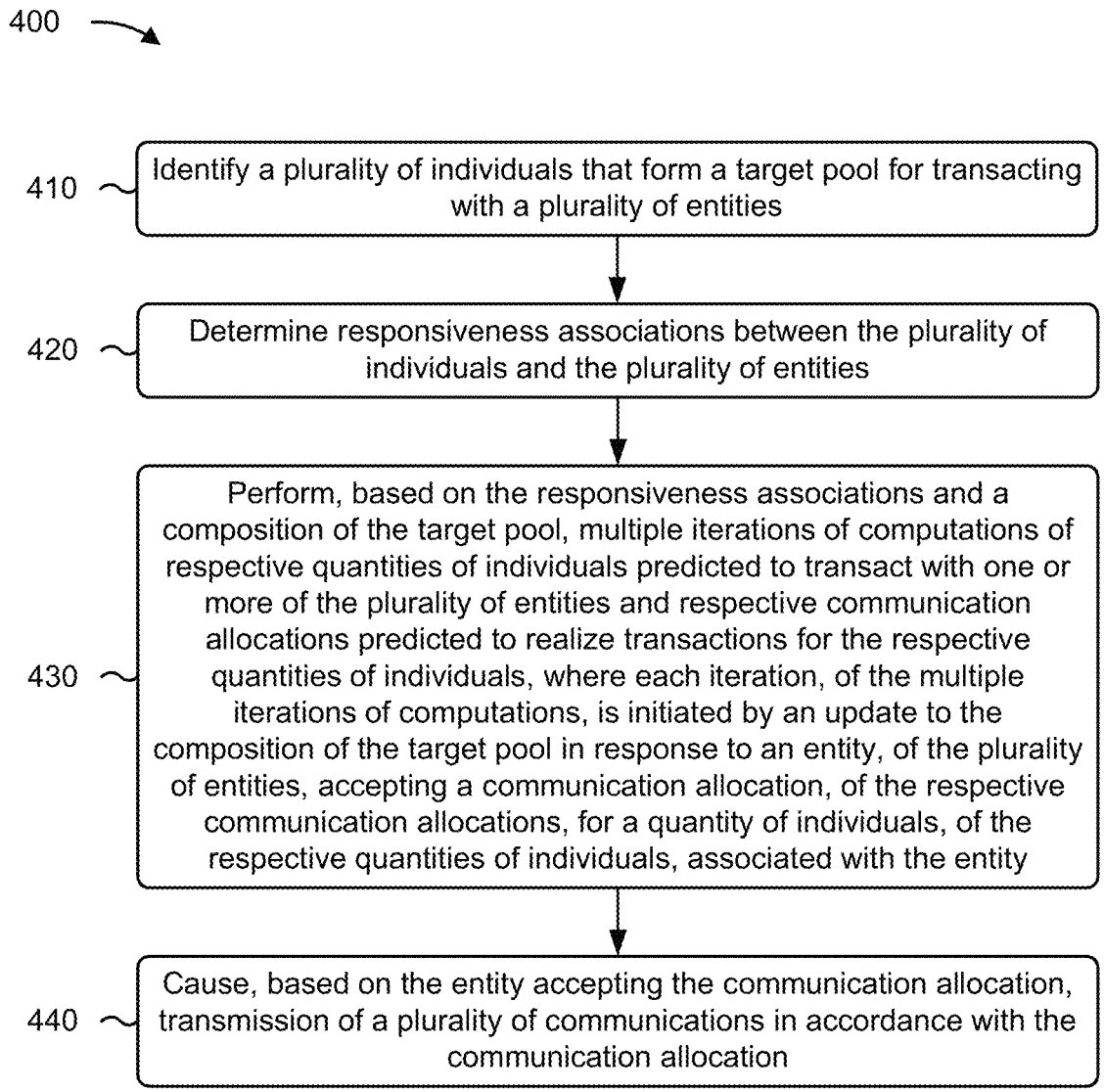
FIG. 4 is a flowchart of an example process associated with communication transmission using a communication allocation based on iterative processing, in accordance with some embodiments of the present disclosure.

FIG. 4 is a flowchart of an example process 400 associated with communication transmission using a communication allocation based on iterative processing. In some implementations, one or more process blocks of FIG. 4 may be performed by the allocation system 210. In some implementations, one or more process blocks of FIG. 4 may be performed by another device or a group of devices separate from or including the allocation system 210, such as the data repository 220, the data system 230, the entity device 240, and/or the user device 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include identifying a plurality of individuals that form a target pool for transacting with a plurality of entities (block 410). For example, the allocation system 210 (e.g., using processor 320, memory 330, and/or communication component 360) may identify a plurality of individuals that form a target pool for transacting with a plurality of entities, as described above in connection with reference number 110 of FIG. 1A. As an example, the allocation system 210 may retrieve (e.g., from the data repository 220) a dataset indicating a plurality of individuals that form a target pool for transacting with a plurality of entities.

As further shown in FIG. 4, process 400 may include determining responsiveness associations between the plurality of individuals and the plurality of entities (block 420). For example, the allocation system 210 (e.g., using processor 320 and/or memory 330) may determine responsiveness associations between the plurality of individuals and the plurality of entities, as described above in connection with reference number 120 of FIG. 1B. As an example, the allocation system 210 may use a machine learning model trained to determine responsiveness associations, described above, among other examples.

As further shown in FIG. 4, process 400 may include performing, based on the responsiveness associations and a composition of the target pool, multiple iterations of computations of respective quantities of individuals predicted to transact with one or more of the plurality of entities and respective communication allocations predicted to realize transactions for the respective quantities of individuals, where each iteration, of the multiple iterations of computations, is initiated by an update to the composition of the target pool in response to an entity, of the plurality of entities, accepting a communication allocation, of the respective communication allocations, for a quantity of individuals, of the respective quantities of individuals, associated with the entity (block 430). For example, the allocation system 210 (e.g., using processor 320 and/or memory 330) may perform, based on the responsiveness associations and a composition of the target pool, multiple iterations of computations of respective quantities of individuals predicted to transact with one or more of the plurality of entities and respective communication allocations predicted to realize transactions for the respective quantities of individuals, as described above in connection with reference number 130 of FIG. 1B. As an example, in an iteration, the allocation system 210 may compute (e.g., determine), for every remaining entity that has not accepted a communication allocation, a quantity of individuals predicted to transact with the entity and a communication allocation predicted to realize transactions for the quantity of individuals.

As further shown in FIG. 4, process 400 may include causing, based on the entity accepting the communication allocation, transmission of a plurality of communications in accordance with the communication allocation (block 440). For example, the allocation system 210 (e.g., using processor 320, memory 330, and/or communication component 360) may cause, based on the entity accepting the communication allocation, transmission of a plurality of communications in accordance with the communication allocation, as described above in connection with reference number 175 of FIG. 1F. As an example, the communications may indicate marketing for a transaction (e.g., in connection with purchase of a vehicle), an offer for a transaction, an offer for financing in connection with a transaction, or the like, in connection with the entity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for communication transmission using a communication allocation based on iterative processing, the system comprising:
   one or more memories; and
   one or more processors, communicatively coupled to the one or more memories, configured to:
      cause population of a first database with a first plurality of records relating to a plurality of individuals that form a target pool for transacting with a plurality of entities,
         wherein each record, of the first plurality of records, is unique to a respective individual of the plurality of individuals;
      cause population of a second database with a second plurality of records indicating responsiveness associations between the plurality of individuals and the plurality of entities;
      perform one or more iterations of populations of a third database,
         wherein each iteration, of the one or more iterations of populations, causes the third database to be populated with records that indicate, based on a composition of the target pool and the responsiveness associations indicated by the second plurality of records, respective quantities of individuals predicted to transact with one or more of the plurality of entities and respective communication allocations predicted to realize transactions for the respective quantities of individuals, and
         wherein each iteration, of the one or more iterations of populations, is initiated by an update to the first database indicating an update to the composition of the target pool in response to an entity, of the plurality of entities, accepting a communication allocation, of the respective communication allocations, for a quantity of individuals, of the respective quantities of individuals, associated with the entity;
      transmit, for a particular entity, of the plurality of entities, and to an entity device associated with the particular entity, information indicating a particular quantity of individuals, of the respective quantities of individuals, and a particular communication allocation, of the respective communication allocations,
         wherein transmitting the information causes the information to be presented in a user interface displayed on the entity device, and
         wherein the user interface includes an input element for accepting the particular communication allocation; and
      cause, based on the particular entity accepting the particular communication allocation via the user interface presented on the entity device, transmission of a plurality of communications in accordance with the particular communication allocation.

2. The system of claim 1, wherein the one or more processors, to perform the one or more iterations of populations of the third database, are configured to:
   cause, in a first iteration of the one or more iterations of populations, population of the third database with first records, wherein the first records are based on a first composition of the target pool and the responsiveness associations indicated by the second plurality of records; and cause, in a second iteration of the one or more iterations of populations, population of the third database with second records, wherein the second records are based on a second composition of the target pool, resulting from removal of one or more individuals associated with an accepted communication allocation from the first composition of the target pool, and the responsiveness associations indicated by the second plurality of records.

3. The system of claim 2, wherein, in the first iteration, the first records indicate, based on the first composition of the target pool and the responsiveness associations indicated by the second plurality of records, first respective quantities of individuals predicted to transact with a first set of the plurality of entities and first respective communication allocations predicted to realize transactions for the first respective quantities of individuals, and wherein, in the second iteration, the second records indicate, based on the second composition of the target pool and the responsiveness associations indicated by the second plurality of records, second respective quantities of individuals predicted to transact with a second set of the plurality of entities and second respective communication allocations predicted to realize transactions for the second respective quantities of individuals, wherein the first set of the plurality of entities includes at least one entity that is not included in the second set of the plurality of entities.

4. The system of claim 1, wherein the one or more processors are further configured to:

cause, based on the particular entity accepting the particular communication allocation, updating of one or more records, of the first plurality of records, to indicate removal of the quantity of individuals indicated for the particular entity from the target pool.

5. The system of claim 1, wherein the one or more processors are further configured to:

retrieve, from a data repository and using a data loader function, a dataset indicating the plurality of individuals that form the target pool, wherein the dataset is distributed across multiple data repositories.

6. The system of claim 1, wherein the respective quantities of individuals predicted to transact with the one or more of the plurality of entities are predicted to transact with the one or more of the plurality of entities in connection with vehicles.

7. The system of claim 1, wherein the plurality of communications include one or more of email messages or text messages.

8. The system of claim 1, wherein the particular communication allocation indicates a quantity of the plurality of communications, and wherein the quantity of the plurality of communications is greater than the quantity of the individuals indicated for the particular entity.

9. The system of claim 1, wherein the one or more iterations of populations include multiple iterations of populations.

10. The system of claim 1, wherein the plurality of individuals are associated with respective credit scores that satisfy a credit score threshold, and wherein the target pool represents a set of individuals that have sufficient financial qualifications to conduct one or more transactions with one or more of the plurality of entities.

11. The system of claim 1, wherein the one or more processors, to cause the transmission of the plurality of communications in accordance with the particular communication allocation are configured to:

generate a link that is configured to launch a user interface on a user device associated with a particular individual of the plurality of individuals, or generate a link that is configured to initiate a communication session between the particular individual and the particular entity.

12. A method of communication transmission using a communication allocation based on iterative processing, comprising:

identifying, by a device, a plurality of individuals that form a target pool for transacting with a plurality of entities;

determining, by the device, responsiveness associations between the plurality of individuals and the plurality of entities;

performing, by the device and based on the responsiveness associations and a composition of the target pool, multiple iterations of computations of respective quantities of individuals predicted to transact with one or more of the plurality of entities and respective communication allocations predicted to realize transactions for the respective quantities of individuals, wherein each iteration, of the multiple iterations of computations, is initiated by an update to the composition of the target pool in response to an entity, of the plurality of entities, accepting a communication allocation, of the respective communication allocations, for a quantity of individuals, of the respective quantities of individuals, associated with the entity;

transmitting, by the device, for a particular entity, of the plurality of entities, and to an entity device associated with the particular entity, information indicating a particular quantity of individuals, of the respective quantities of individuals, and a particular communication allocation, of the respective communication allocations, wherein transmitting the information causes the information to be presented in a user interface displayed on the entity device, and wherein the user interface includes an input element for accepting the particular communication allocation; and causing, by the device and based on the particular entity accepting the particular communication allocation via the user interface presented on the entity device, transmission of a plurality of communications in accordance with the particular communication allocation.

13. The method of claim 12, wherein performing the multiple iterations of computations comprises:

performing, in a first iteration of the multiple iterations of computations and based on a first composition of the target pool, computations of first respective quantities of individuals predicted to transact with a first set of the plurality of entities and first respective communication allocations predicted to realize transactions for the first respective quantities of individuals; and performing, in a second iteration of the multiple iterations of computations and based on a second composition of the target pool, computation of second respective quantities of individuals predicted to transact with a second set of the plurality of entities and second respective communication allocations predicted to realize transactions for the second respective quantities of individuals,
  wherein the second composition of the target pool differs from the first composition of the target pool, and the second set of the plurality of entities differs from the first set of the plurality of entities, based on an entity, of the first set of the plurality of entities, accepting a communication allocation.

14. The method of claim 12, further comprising:
causing population of a first database with a first plurality of records relating to the plurality of individuals,
  wherein each record, of the first plurality of records, is unique to a respective individual of the plurality of individuals;
causing population of a second database with a second plurality of records indicating the responsiveness associations between the plurality of individuals and the plurality of entities; and
performing multiple iterations of populations of a third database,
  wherein each iteration, of the multiple iterations of populations, causes the third database to be populated with records based on a respective iteration of the multiple iterations of computations.

15. The method of claim 12, wherein the respective quantities of individuals and the respective communication allocations are based on the composition of the target pool, the responsiveness associations, and data characterizing a probability that an individual will transact with an entity.

16. The method of claim 12, wherein the plurality of communications include one or more of email messages or text messages.

17. A non-transitory computer-readable medium storing a set of instructions for iterative processing, the set of instructions comprising:
  one or more instructions that, when executed by one or more processors of a device, cause the device to:
    identify a plurality of individuals that form a target pool for transacting with a plurality of entities;
    determine responsiveness associations between the plurality of individuals and the plurality of entities;
    perform, based on a composition of the target pool and the responsiveness associations, multiple iterations of computations of respective quantities of individuals predicted to transact with one or more of the plurality of entities and respective communication allocations predicted to realize transactions for the respective quantities of individuals,
      wherein each iteration, of the multiple iterations of computations, is initiated by an update to the composition of the target pool in response to an entity, of the plurality of entities, accepting a communication allocation, of the respective communication allocations, for a quantity of individuals, of the respective quantities of individuals, associated with the entity;
    transmit, for a particular entity, of the plurality of entities, and to an entity device associated with the particular entity, information indicating a particular quantity of individuals, of the respective quantities of individuals, and a particular communication allocation, of the respective communication allocations,
      wherein transmitting the information causes the information to be presented in a user interface displayed on the entity device, and
      wherein the user interface includes an input element for accepting the particular communication allocation; and
    cause, based on the particular entity accepting the particular communication allocation via the user interface presented on the entity device, transmission of a plurality of communications in accordance with the particular communication allocation.

18. The non-transitory computer-readable medium of claim 17, wherein the particular communication allocation indicates a quantity of the plurality of communications, and
  wherein the quantity of the plurality of communications is greater than the quantity of the individuals indicated for the particular entity.

19. The non-transitory computer-readable medium of claim 17, wherein the one or more instructions, that cause the device to perform the multiple iterations of computations, cause the device to:
  perform, in a first iteration of the multiple iterations of computations and based on a first composition of the target pool, computations of first respective quantities of individuals predicted to transact with a first set of the plurality of entities and first respective communication allocations predicted to realize transactions for the first respective quantities of individuals; and
  perform, in a second iteration of the multiple iterations of computations and based on a second composition of the target pool, computation of second respective quantities of individuals predicted to transact with a second set of the plurality of entities and second respective communication allocations predicted to realize transactions for the second respective quantities of individuals,
    wherein the second composition of the target pool differs from the first composition of the target pool, and the second set of the plurality of entities differs from the first set of the plurality of entities, based on an entity, of the first set of the plurality of entities, accepting a communication allocation.

20. The non-transitory computer-readable medium of claim 17, wherein the responsiveness associations between the plurality of individuals and the plurality of entities are based on one or more of:
  distances between first residence locations of the plurality of individuals and locations of the plurality of entities, or
  historical distances between second residence locations of transacting individuals, that have historically transacted with the plurality of entities, and the locations of the plurality of entities.

* * * * *